(12) United States Patent
Poikselka et al.

(10) Patent No.: US 11,388,287 B2
(45) Date of Patent: Jul. 12, 2022

(54) IMS EMERGENCY SESSION HANDLING

(71) Applicant: NOKIA SOLUTIONS AND NETWORKS OY, Espoo (FI)

(72) Inventors: Miikka Juhana Poikselka, Espoo (FI); Jari Mutikainen, Lepsämä (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 157 days.

(21) Appl. No.: 15/526,932

(22) PCT Filed: Nov. 14, 2014

(86) PCT No.: PCT/EP2014/074646
§ 371 (c)(1),
(2) Date: May 15, 2017

(87) PCT Pub. No.: WO2016/074747
PCT Pub. Date: May 19, 2016

(65) Prior Publication Data
US 2019/0098133 A1    Mar. 28, 2019

(51) Int. Cl.
*H04M 11/04* (2006.01)
*H04M 3/51* (2006.01)
(Continued)

(52) U.S. Cl.
CPC ........... *H04M 3/5116* (2013.01); *H04L 63/10* (2013.01); *H04L 65/1006* (2013.01);
(Continued)

(58) Field of Classification Search
CPC ......... H04W 4/02; H04W 48/04; H04W 4/90; H04W 64/00; H04W 4/20

USPC .... 455/404.2, 432.1, 456.1, 456.5, 411, 466, 455/519, 417, 433, 418, 404.1, 515; 370/385, 467, 328, 315
See application file for complete search history.

(56) References Cited

U.S. PATENT DOCUMENTS 8,433,283 B2 * 4/2013 Borislow ............... H04W 4/90
                                                    455/404.2
9,020,113 B2 * 4/2015 Noldus ................. H04M 15/10
                                                    379/114.26
(Continued)

FOREIGN PATENT DOCUMENTS

WO    WO-2008006055 A2 *  1/2008 ............ H04W 76/50

OTHER PUBLICATIONS

International Search Report & Written Opinion dated Jun. 3, 2015 corresponding to International Patent Application No. PCT/EP2014/074646.
(Continued)

*Primary Examiner* — Joseph Arevalo
(74) *Attorney, Agent, or Firm* — Squire Patton Boggs (US) LLP

(57) ABSTRACT

It is provided a method, comprising monitoring if an invitation to an emergency session of an anonymous user is received from an internet protocol address; checking, if the invitation is received, if an identity of a user is correlated to the internet protocol address; replacing, if the internet protocol address is correlated to the identity of the user, the identification of the anonymous user in the invitation by the identity of the user; forwarding the invitation comprising the identity of the user.

16 Claims, 11 Drawing Sheets

(51) Int. Cl.
*H04L 65/1016* (2022.01)
*H04L 65/10* (2022.01)
*H04L 65/1069* (2022.01)
*H04L 65/1073* (2022.01)
*H04W 76/50* (2018.01)
*H04W 4/90* (2018.01)
*H04M 7/00* (2006.01)
*H04L 9/40* (2022.01)
*H04N 21/00* (2011.01)
*H04W 12/033* (2021.01)
*H04W 12/72* (2021.01)
*H04W 12/108* (2021.01)
*H04M 15/00* (2006.01)
*H04W 12/06* (2021.01)
*H04W 60/04* (2009.01)

(52) U.S. Cl.
CPC ...... *H04L 65/1016* (2013.01); *H04L 65/1069* (2013.01); *H04L 65/1073* (2013.01); *H04M 7/006* (2013.01); *H04M 15/66* (2013.01); *H04N 21/00* (2013.01); *H04W 4/90* (2018.02); *H04W 12/033* (2021.01); *H04W 12/06* (2013.01); *H04W 12/108* (2021.01); *H04W 12/72* (2021.01); *H04W 76/50* (2018.02); *H04M 2203/6045* (2013.01); *H04M 2207/185* (2013.01); *H04W 60/04* (2013.01)

(56) References Cited

U.S. PATENT DOCUMENTS

| | | | | |
|---|---|---|---|---|
| 9,183,560 | B2* | 11/2015 | Abelow | G06Q 10/067 |
| 9,374,397 | B2* | 6/2016 | Platt | H04L 65/403 |
| 2002/0191597 | A1* | 12/2002 | Lundstrom | H04M 15/41 370/356 |
| 2007/0288247 | A1* | 12/2007 | Mackay | G06Q 10/00 705/1.1 |
| 2009/0077383 | A1* | 3/2009 | de Monseignat | H04L 63/0823 713/175 |
| 2009/0296688 | A1* | 12/2009 | Bakker | H04M 1/72536 370/352 |
| 2009/0296689 | A1* | 12/2009 | Bakker | H04W 4/90 370/352 |
| 2009/0298458 | A1* | 12/2009 | Bakker | H04M 3/42348 455/404.1 |
| 2010/0023510 | A1* | 1/2010 | Naono | G06F 16/9535 707/E17.014 |
| 2010/0205541 | A1* | 8/2010 | Rapaport | G06Q 10/10 715/753 |
| 2011/0307580 | A1* | 12/2011 | Fullett | H04L 67/2804 709/219 |
| 2012/0069131 | A1* | 3/2012 | Abelow | G06Q 10/067 348/14.01 |
| 2013/0197998 | A1* | 8/2013 | Buhrmann | G06Q 30/0255 705/14.53 |
| 2013/0259026 | A1* | 10/2013 | Ross | H04L 65/1006 370/352 |
| 2014/0123257 | A1* | 5/2014 | Gordon | H04L 67/1095 726/7 |
| 2014/0282871 | A1* | 9/2014 | Rowland | H04L 63/20 726/3 |
| 2015/0078173 | A1* | 3/2015 | Javed | H04W 36/00 370/241 |
| 2017/0055141 | A1* | 2/2017 | Kim | H04W 76/10 |
| 2017/0293899 | A1* | 10/2017 | Furche | G06Q 20/065 |
| 2017/0293912 | A1* | 10/2017 | Furche | G06Q 20/3829 |
| 2018/0049095 | A1* | 2/2018 | Mishra | H04W 40/02 |

OTHER PUBLICATIONS

3GPP TS 23.401 V13.0.0 (Sep. 2014), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 13), Sep. 17, 2014, XP050923675.
3GPP TS 23.167 V12.0.0 (Sep. 2014), Technical Specification, 3rd Generation Partnership Project; Technical Specification Group Services and System Aspects; IP Multimedia Subsystem (IMS) emergency sessions (Release 12), Sep. 22, 2014, XP050916434.
3GPP TS 24.301 V12.6.0 (Sep. 2014), Technical Specification, 3rd Generation Partnership Project; Technical Specification Group Core Network and Terminals; Non-Access-Stratum (NAS) protocol for Evolved Packet System EPS); Stage 3 (Release 12), Sep. 2014.
3GPP TS 29.214 V12.5.0 (Sep. 2014), Technical Specification, 3rd Generation Partnership Project; Technical Specification Group Core Network and Terminals; Policy and Charging Control over Rx reference point (Release 12), Sep. 2014.
3GPP TS 24.229 V12.6.0 (Sep. 2014), Technical Specification, 3rd Generation Partnership Project; Technical Specification Group Core Network and Terminals; IP multimedia call control protocol based on Session Initiation Protocol (SIP) and Session Description Protocol (SDP); Stage 3 (Release 12), Sep. 2014.
Korean Office Action application No. 10-2017-7016166 dated Nov. 14, 2018.
European Office Action corresponding to Application No. 14 796 787.1, dated Jan. 16, 2019.
Korean Office Action corresponding to Application No. 10-2017-7016166, dated May 24, 2019.
European Office Action corresponding to EP Application No. 14 796 787.1, dated Feb. 11, 2020.
European Communication pursuant to Article 94(3) EPC, corresponding to EP Application No. 14 796 787.1, dated Apr. 23, 2021.
European Office Action issued in corresponding European Patent Application No. 14 796 787.1-1213 dated May 23, 2022.

* cited by examiner

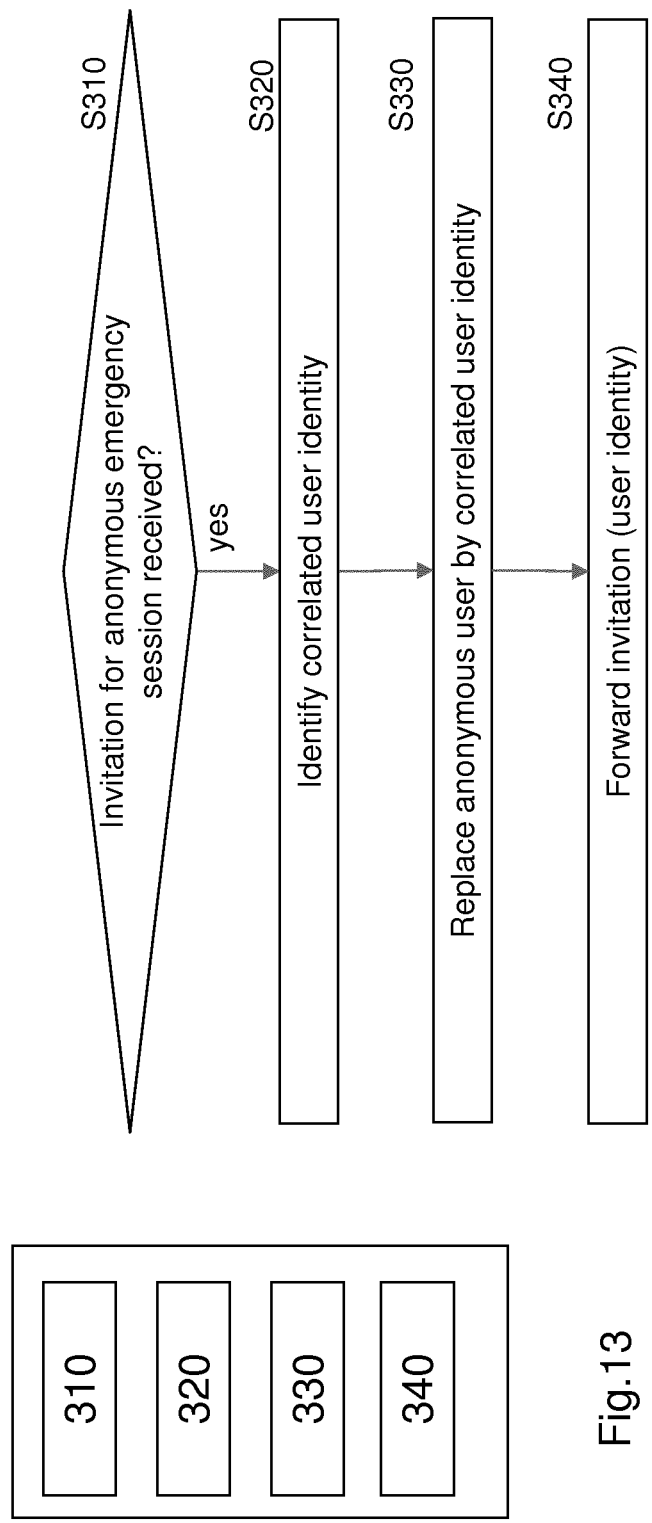

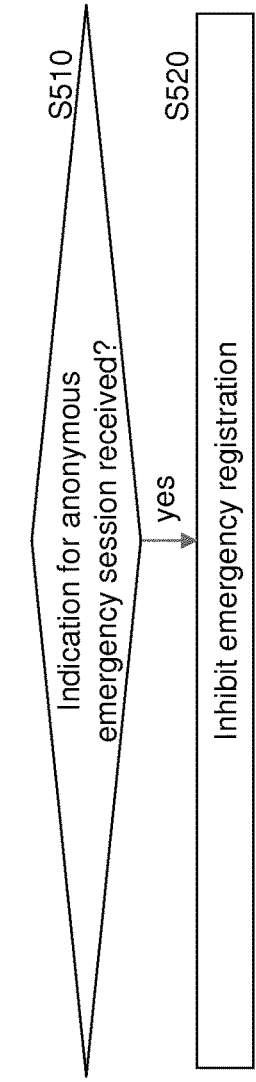
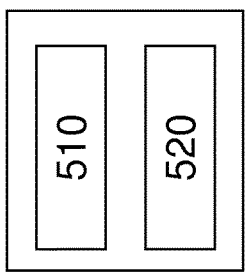
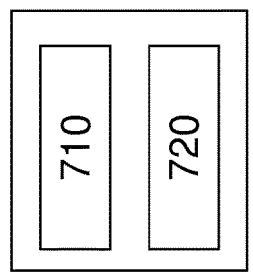
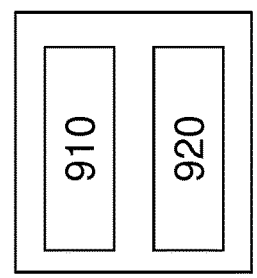

IMS EMERGENCY SESSION HANDLING

FIELD OF THE INVENTION

The present invention relates to an apparatus, a method, and a computer program product related to IMS emergency session handling. More particularly, the present invention relates to an apparatus, a method, and a computer program product related to IMS emergency session handling for roaming users.

BACKGROUND OF THE INVENTION

Abbreviations
3GPP 3rd Generation Partnership Project
APN Access Point Name
BG Boarder Gateway
CN Core Network
CSCF Call Session Control Function
EDGE Enhanced Datarate for GSM Evolution
EPC Evolved Packet Core
EPS Evolved Packet System
GGSN Gateway GPRS Support Node
GIBA GPRS-IMS Bundled Authentication
GPRS Generic Packet Radio Service
GSM Global System for Mobile Communication
IM IP Multimedia
IMS IP Multimedia Subsystem
IP Internet Protocol
IPSec IP Security
LTE Long Term Evolution
LTE-A LTE Advanced
MME Mobility Management Entity
MSISDN Mobile Station Integrated Services Digital Network
NAS Non-Access Stratum
NE Network Element
PCRF Policy and Charging Rules Function
P-CSCF Proxy CSCF
PDN Packet Data Network
PDN GW PDN Gateway
PDP Packet Data Protocol
PGW PDN Gateway
PSAP Public Safety Answering Point
S-GW Serving Gateway
SGSN Serving GPRS Support Node
TS Technical Specification
UE User Equipment
UMTS Universal Mobile Telecommunications System
URI Uniform Resource Identifier
WiFi Wireless Fidelity
WLAN Wireless Local Area Network IMS emergency sessions are described in 3GPP TS 23.167. For IMS emergency sessions, emergency bearer services are needed. Emergency bearer services are functionalities provided by the serving network when the network is configured to support emergency services. Overview of EPC IMS emergency session support is given in 3GPP TS 23.401 section 4.3.12.

Voice over LTE roaming model has so far assumed a model where both PDN GW and P-CSCF are located in the visited network (see FIG. 1). As may be seen in FIG. 1, a UE roaming in the visited network is connected via S-GW (or SGSN) and P-GW (or GGSN) defining a PDP/Bearer context to P-CSCF of the IMS of the visited network. Thus, the UE is virtually present in IMS of the visited network such that the IP address of the UE is known to IMS of the visited network. The IMS of the visited network is connected thorough BGs and (potentially) an IP backbone of an Inter-Service Provider to the IMS of the Home Network of the UE. This model is named local breakout roaming model.

However, now several operators are seriously considering changing the roaming model. The proposed roaming model is called home routed model where both PDN GW and P-CSCF are in the home network when user is roaming (see FIG. 2). Accordingly, the roaming UE is connected via S-GW (or SGSN), border gateways, and (potentially) the IP backbone of the Inter-Service provider to the P-GW (or GGSN) of the home network and from there to the IMS of the home network comprising the P-CSCF thereof. Accordingly, the bearer/PDP context is set up between the S-GW (or SGSN) of the visited network and the P-GW (or GGSN) of the home network. Consequently, the UE is virtually present in the IMS of the home network such that the IP address of the UE is known to IMS of the home network.

The primary reason for this change is that some operators wish to avoid deploying a roaming interface between visited IMS network (P-CSCF) and home IMS network which is needed in the deployment of FIG. 1 (local breakout roaming model) in order to register the UE for a session.

SUMMARY OF THE INVENTION

It is an object of the present invention to improve the prior art.

According to a first aspect of the invention, there is provided an apparatus, comprising monitoring means adapted to monitor if a demand for an emergency bearer service is received from a user; requesting means adapted to request, if the demand is received, a creation of an emergency bearer, wherein the request includes an identity of the user into the request.

The apparatus may further comprise checking means adapted to check if the user is roaming; and inhibiting means adapted to inhibit the requesting means from including the identity into the request if the user is not roaming.

According to a second aspect of the invention, there is provided an apparatus, comprising monitoring means adapted to monitor if a demand to create an emergency bearer is received, wherein the demand comprises an identity of a user; requesting means adapted to request an authorization of the emergency bearer, wherein the request comprises the identity of the user and an internet protocol address assigned to the user.

According to a third aspect of the invention, there is provided an apparatus, comprising monitoring means adapted to monitor if an information about an emergency procedure is received, wherein the information comprises an internet protocol address from where the at least one of the registration and the invitation is originated; identifying means adapted to identify an identity of a user correlated to the internet protocol address; providing means adapted to provide the identity of the user in response to the information.

According to a fourth aspect of the invention, there is provided an apparatus, comprising monitoring means adapted to monitor if an invitation to an emergency session of an anonymous user is received from an internet protocol address; correlation checking means, if the invitation is received, adapted to check if an identity of a user is correlated to the internet protocol address; replacing means adapted to replace, if the internet protocol address is correlated to the identity of the user, the identification of the anonymous user in the invitation by the identity of the user;

forwarding means adapted to forward the invitation comprising the identity of the user.

The apparatus may further comprise registration checking means adapted to check if an attempt to register for a registered emergency session from the internet protocol address fails; supervising means adapted to supervise, if the attempt fails, if a first message received in response to a sent information on the failed attempt comprises the identity of the user; storing means adapted to store, if the first message comprises the identity of the user, the identity of the user as correlated to the internet protocol address.

The correlation checking means may be adapted to provide an information on the invitation and to receive the identity in response to the information.

The apparatus may further comprise indicating means adapted to indicate, if the registration fails, to set up an anonymous emergency session in response to the attempt to register.

The apparatus may further comprise requesting means adapted to request the identity of the user if an invitation of an anonymous user to set up an emergency session is received, wherein the request comprises the internet protocol address; response checking means adapted to check if a second message received in response to the request comprises the identity of the user; wherein the correlation checking means may be adapted to correlate, if the second message comprises the identity of the user, the identity of the user to the internet protocol address.

According to a fifth aspect of the invention, there is provided an apparatus, comprising monitoring means adapted to monitor if an attempt to register an emergency session of a user is received, wherein the attempt comprises a first internet address as an origin, and the attempt does not comprise an authorization header; requesting means adapted to request an identity of the user if the attempt is received, wherein the request comprises the first internet protocol address; extracting means adapted to extract the identity of the user from a message received in response to the request; providing means adapted to provide, if the message comprises the identity of the user, the identity of the user in response to the attempt.

The attempt may comprise the first internet protocol address and a second internet protocol address, the first internet protocol address defines an origin of the emergency session and the second internet protocol address denotes a source of a message comprising the attempt; the extracting means may be adapted to further extract a network authorized internet protocol address from the received message; and the apparatus may further comprise comparing means adapted to compare the second internet protocol address with the network authorized internet protocol address; inhibiting means adapted to inhibit the providing means from providing the identity of the user if the second internet protocol address is different from the network authorized internet protocol address.

According to a sixth aspect of the invention, there is provided an apparatus, comprising monitoring circuitry configured to monitor if a demand for an emergency bearer service is received from a user; requesting circuitry configured to request, if the demand is received, a creation of an emergency bearer, wherein the request includes an identity of the user into the request.

The apparatus may further comprise checking circuitry configured to check if the user is roaming; and inhibiting circuitry configured to inhibit the requesting circuitry from including the identity into the request if the user is not roaming.

According to a seventh aspect of the invention, there is provided an apparatus, comprising monitoring circuitry configured to monitor if a demand to create an emergency bearer is received, wherein the demand comprises an identity of a user; requesting circuitry configured to request an authorization of the emergency bearer, wherein the request comprises the identity of the user and an internet protocol address assigned to the user.

According to a eighth aspect of the invention, there is provided an apparatus, comprising monitoring circuitry configured to monitor if an information about an emergency procedure is received, wherein the information comprises an internet protocol address from where the at least one of the registration and the invitation is originated; identifying circuitry configured to identify an identity of a user correlated to the internet protocol address; providing circuitry configured to provide the identity of the user in response to the information.

According to a ninth aspect of the invention, there is provided an apparatus, comprising monitoring circuitry configured to monitor if an invitation to an emergency session of an anonymous user is received from an internet protocol address; correlation checking circuitry, if the invitation is received, configured to check if an identity of a user is correlated to the internet protocol address; replacing circuitry configured to replace, if the internet protocol address is correlated to the identity of the user, the identification of the anonymous user in the invitation by the identity of the user; forwarding circuitry configured to forward the invitation comprising the identity of the user.

The apparatus may further comprise registration checking circuitry configured to check if an attempt to register for a registered emergency session from the internet protocol address fails; supervising circuitry configured to supervise, if the attempt fails, if a first message received in response to a sent information on the failed attempt comprises the identity of the user; storing circuitry configured to store, if the first message comprises the identity of the user, the identity of the user as correlated to the internet protocol address.

The correlation checking circuitry may be configured to provide an information on the invitation and to receive the identity in response to the information.

The apparatus may further comprise indicating circuitry configured to indicate, if the registration fails, to set up an anonymous emergency session in response to the attempt to register.

The apparatus may further comprise requesting circuitry configured to request the identity of the user if an invitation of an anonymous user to set up an emergency session is received, wherein the request comprises the internet protocol address; response checking circuitry configured to check if a second message received in response to the request comprises the identity of the user; wherein the correlation checking circuitry may be configured to correlate, if the second message comprises the identity of the user, the identity of the user to the internet protocol address.

According to a tenth aspect of the invention, there is provided an apparatus, comprising monitoring circuitry configured to monitor if an attempt to register an emergency session of a user is received, wherein the attempt comprises a first internet address as an origin, and the attempt does not comprise an authorization header; requesting circuitry configured to request an identity of the user if the attempt is received, wherein the request comprises the first internet protocol address; extracting circuitry configured to extract the identity of the user from a message received in response to the request; providing circuitry configured to provide, if the message comprises the identity of the user, the identity of the user in response to the attempt.

The attempt may comprise the first internet protocol address and a second internet protocol address, the first internet protocol address defines an origin of the emergency session and the second internet protocol address denotes a source of a message comprising the attempt; the extracting circuitry may be configured to further extract a network authorized internet protocol address from the received message; and the apparatus may further comprise comparing circuitry configured to compare the second internet protocol address with the network authorized internet protocol address; inhibiting circuitry configured to inhibit the providing circuitry from providing the identity of the user if the second internet protocol address is different from the network authorized internet protocol address.

In the apparatus according to any of the first to tenth aspects, the identity of the user may be considered to be authenticated by a home network of the user. In particular, the identity of the user may comprise at least one of a mobile station integrated services digital network number and a unified resource identifier.

According to an eleventh aspect of the invention, there is provided an apparatus, comprising monitoring means adapted monitor if an indication to invite to an anonymous emergency session is received; inhibiting means adapted to inhibit, if the indication is received, the apparatus from attempting to perform emergency registration.

The monitoring means may be adapted to monitor if a received response informing on a failure of a registration of the registered emergency session comprises the indication.

The monitoring means may be adapted to monitor if the indication is received at at least one of the following occasions:
  a packet service attach;
  a tracking area update; and
  a packet data network connectivity request.

The apparatus may further comprise checking means adapted to check if a terminal comprising the apparatus is roaming; home user prohibiting means adapted to prohibit, if the terminal is not roaming, the inhibiting means from inhibiting.

According to a twelfth aspect of the invention, there is provided an apparatus, comprising monitoring means adapted to monitor if a user is to be connected to the apparatus;
  indicating means adapted to indicate to the user, if the user is to be connected, not to register for an emergency session.

The apparatus may further comprise checking means adapted to check if the user is roaming; inhibiting means adapted to inhibit, if the user is not roaming, the indicating means from indicating.

The monitoring means may be adapted to monitor at at least one of the following occasions:
  a packet service attach of the user;
  a tracking area update of the user; and
  a packet data network connectivity request of the user.

According to an thirteenth aspect of the invention, there is provided an apparatus, comprising monitoring circuitry adapted monitor if an indication to invite to an anonymous emergency session is received; inhibiting circuitry configured to inhibit, if the indication is received, the apparatus from attempting to perform emergency registration.

The monitoring circuitry may be configured to monitor if a received response informing on a failure of a registration of the registered emergency session comprises the indication.

The monitoring circuitry may be configured to monitor if the indication is received at at least one of the following occasions:
  a packet service attach;
  a tracking area update; and
  a packet data network connectivity request.

The apparatus may further comprise checking circuitry configured to check if a terminal comprising the apparatus is roaming; home user prohibiting circuitry configured to prohibit, if the terminal is not roaming, the inhibiting circuitry from inhibiting.

According to a fourteenth aspect of the invention, there is provided an apparatus, comprising monitoring circuitry configured to monitor if a user is to be connected to the apparatus; indicating circuitry configured to indicate to the user, if the user is to be connected, not to register for an emergency session.

The apparatus may further comprise checking circuitry configured to check if the user is roaming; inhibiting circuitry configured to inhibit, if the user is not roaming, the indicating circuitry from indicating.

The monitoring circuitry may be configured to monitor at at least one of the following occasions:
  a packet service attach of the user;
  a tracking area update of the user; and
  a packet data network connectivity request of the user.

According to a fifteenth aspect of the invention, there is provided a method, comprising monitoring if a demand for an emergency bearer service is received from a user; requesting, if the demand is received, a creation of an emergency bearer, wherein the request includes an identity of the user into the request.

The method may further comprise checking if the user is roaming; and inhibiting the requesting from including the identity into the request if the user is not roaming.

According to a sixteenth aspect of the invention, there is provided a method, comprising monitoring if a demand to create an emergency bearer is received, wherein the demand comprises an identity of a user; requesting an authorization of the emergency bearer, wherein the request comprises the identity of the user and an internet protocol address assigned to the user.

According to a seventeenth aspect of the invention, there is provided a method, comprising monitoring if an information about an emergency procedure is received, wherein the information comprises an internet protocol address from where the at least one of the registration and the invitation is originated; identifying an identity of a user correlated to the internet protocol address; providing the identity of the user in response to the information.

According to an eighteenth aspect of the invention, there is provided a method, comprising monitoring if an invitation to an emergency session of an anonymous user is received from an internet protocol address; checking, if the invitation is received, if an identity of a user is correlated to the internet protocol address; replacing, if the internet protocol address is correlated to the identity of the user, the identification of the anonymous user in the invitation by the identity of the user; forwarding the invitation comprising the identity of the user.

The method may further comprise checking if an attempt to register for a registered emergency session from the internet protocol address fails; supervising, if the attempt fails, if a first message received in response to a sent information on the failed attempt comprises the identity of the user; storing, if the first message comprises the identity of the user, the identity of the user as correlated to the internet protocol address.

The checking if the identity of the user is correlated to the internet protocol address may comprise providing an information on the invitation and receiving the identity in response to the information.

The method may further comprise indicating, if the registration fails, to set up an anonymous emergency session in response to the attempt to register.

The method may further comprise requesting the identity of the user if an invitation of an anonymous user to set up an emergency session is received, wherein the request comprises the internet protocol address; checking if a second message received in response to the request comprises the identity of the user; wherein the checking if the identity of the user is correlated to the internet protocol address may comprise correlating, if the second message comprises the identity of the user, the identity of the user to the internet protocol address.

According to a nineteenth aspect of the invention, there is provided a method, comprising monitoring if an attempt to register an emergency session of a user is received, wherein the attempt comprises a first internet address as an origin, and the attempt does not comprise an authorization header; requesting an identity of the user if the attempt is received, wherein the request comprises the first internet protocol address; extracting the identity of the user from a message received in response to the request; providing, if the message comprises the identity of the user, the identity of the user in response to the attempt.

The attempt may comprise the first internet protocol address and a second internet protocol address, the first internet protocol address defines an origin of the emergency session and the second internet protocol address denotes a source of a message comprising the attempt; the extracting may comprise further extracting a network authorized internet protocol address from the received message; and the method may further comprise comparing the second internet protocol address with the network authorized internet protocol address; inhibiting the providing of the identity of the user if the second internet protocol address is different from the network authorized internet protocol address.

In the methods according to any of the fifteenth to nineteenth aspects, the identity of the user may be considered to be authenticated by a home network of the user. In particular, the identity of the user may comprise at least one of a mobile station integrated services digital network number and a unified resource identifier.

According to a twentieth aspect of the invention, there is provided a method, comprising monitoring if an indication to invite to an anonymous emergency session is received; inhibiting, if the indication is received, an apparatus performing the method from attempting to perform emergency registration.

The monitoring may be adapted to monitor if a received response informing on a failure of a registration of the registered emergency session comprises the indication.

The monitoring may be adapted to monitor if the indication is received at at least one of the following occasions:
a packet service attach;
a tracking area update; and
a packet data network connectivity request.

The method may further comprise checking if a terminal performing the method is roaming; prohibiting, if the terminal is not roaming, the inhibiting of the attempting to perform the emergency registration.

According to a twenty-first aspect of the invention, there is provided a method, comprising monitoring if a user is to be connected to an apparatus performing the method; indicating to the user, if the user is to be connected, not to register for an emergency session.

The method may further comprise checking if the user is roaming; inhibiting, if the user is not roaming, the indicating.

The monitoring may be adapted to monitor at at least one of the following occasions:
a packet service attach of the user;
a tracking area update of the user; and
a packet data network connectivity request of the user.

Each of the methods of the fifteenth to twenty-first aspects may be a method of IMS emergency session handling.

According to a twenty-second aspect of the invention, there is provided a computer program product comprising a set of instructions which, when executed on an apparatus, is configured to cause the apparatus to carry out the method according to any one of the fifteenth to twenty-first aspects. The computer program product may be embodied as a computer-readable medium or directly loadable into a computer.

According to some embodiments of the invention, at least the following advantages are provided:
network asserted user identity of the caller may be provided to Public Safety Answering Point
Emergency session set-up for roaming users may be accelerated;
Load on UE and P-CSCF by unsuccessful emergency registrations may be reduced;
UEs may not be affected (backwards compatibility).

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 13 shows an apparatus according to an embodiment of the invention;

FIG. 14 shows a method according to an embodiment of the invention;

FIG. 17 shows an apparatus according to an embodiment of the invention;

FIG. 18 shows a method according to an embodiment of the invention;

FIG. 19 shows an apparatus according to an embodiment of the invention;

FIG. 20 shows a method according to an embodiment of the invention; and

FIG. 21 shows an apparatus according to an embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In FIGS. 3 to 6, the NEs MME, PDN GW, PCRF, and P-CSCF are NEs of the visited network, in which the UE is roaming. The visited network is different from the home network to which the UE belongs. Furthermore, in FIGS. 3 to 6, it is assumed that the home routed model without a roaming interface between IMS of the visited network (visited IMS) and IMS of the home network (home IMS) being employed.

Figure 1:
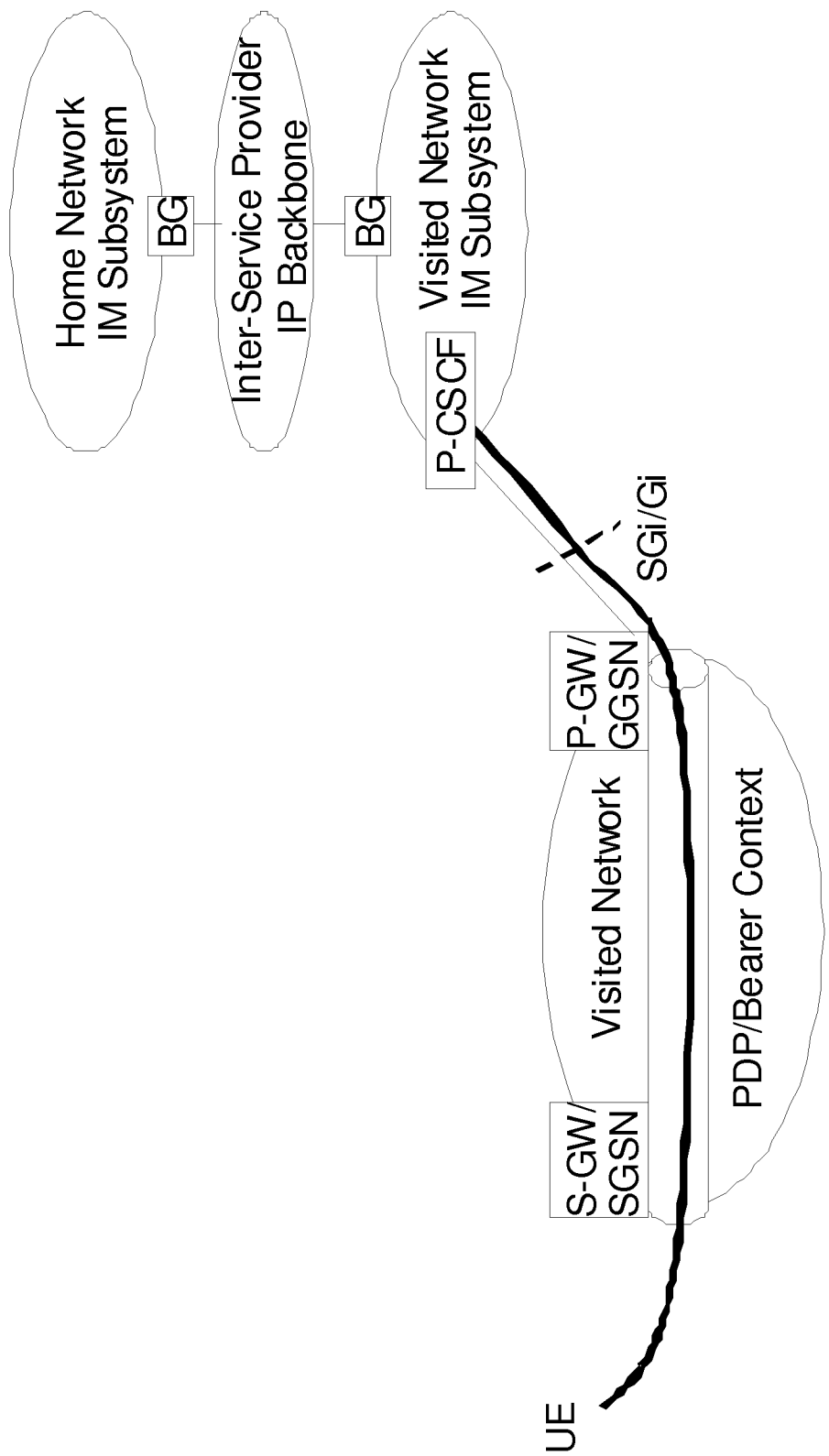
FIG. 1 shows a home roaming model.
Figure 2:
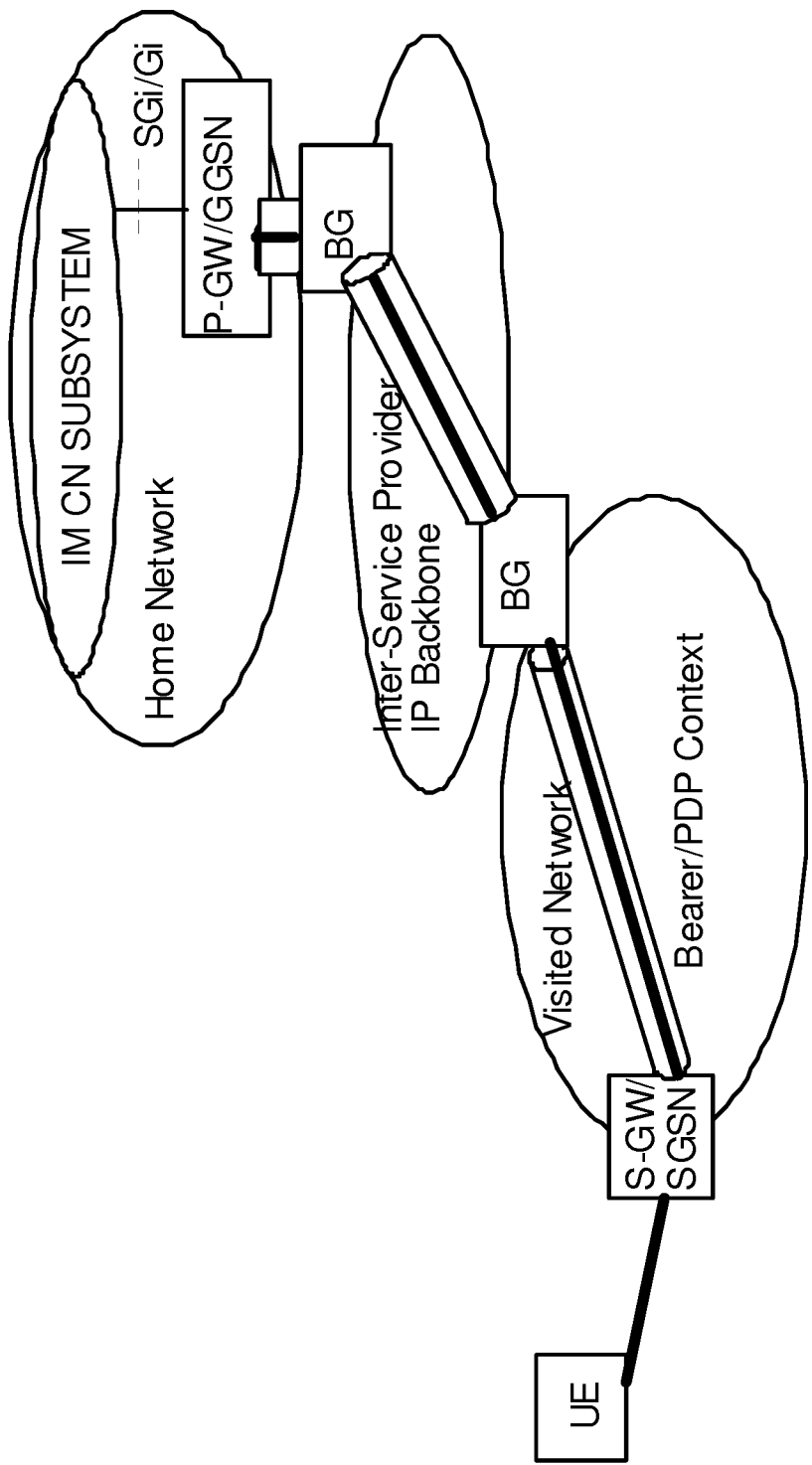
FIG. 2 shows a home routed model.
Figure 3:
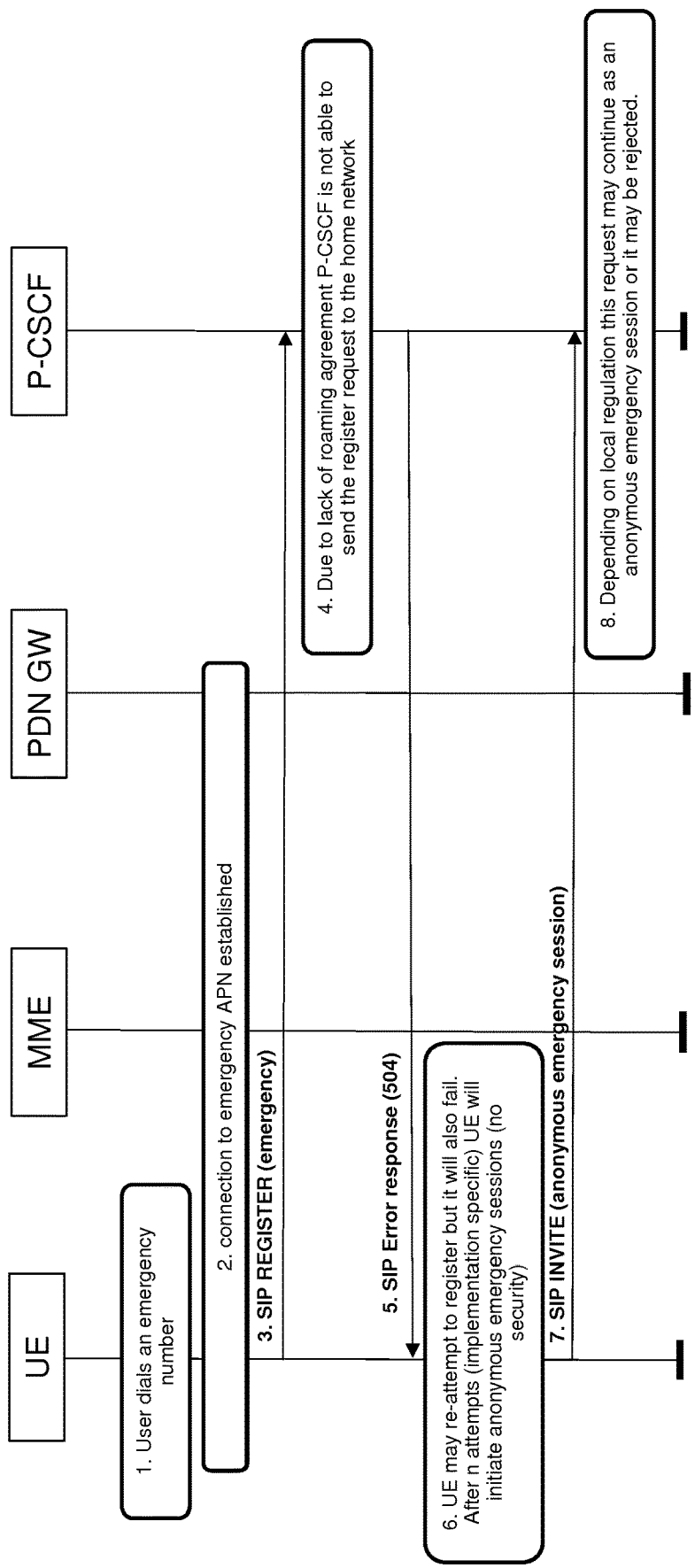
FIG. 3 shows a message flow in order to explain an issue of the home routed model.

When home routed model and, consequently, IMS roaming interface are not in use it causes challenges to handle IMS emergency sessions as those need to be handled in the roaming network when user is roaming. The problem is depicted in FIG. 3.

If the user of the UE dials an emergency number (1.), or if the UE initiates an emergency session for other reasons (e.g. autonomously), a connection to an emergency APN will be established by MME and PDN GW (2.). The emergency APN is related to the visited network.

When the connection to the emergency APN is established, UE tries to register for an emergency session at P-CSCF of IMS of the visited network (3.). Since a roaming interface to home IMS is not established, P-CSCF of the visited PLMN is not able to send the register request to home IMS (4.). Accordingly, the registration fails and P-CSCF returns error response 504 please explain to UE (5.).

The UE may then re-attempt registration (6.) for several times. The number of times may be predefined or configured in the UE. In some cases, there are not any re-attempts.

Then, UE, which is not registered for the emergency call in visited IMS (P-CSCF), may invite to an anonymous emergency session (7.), which is not protected by IPSec.

Depending on the configuration, P-CSCF, which may depend on local regulations, P-CSCF may or may not admit anonymous emergency sessions (8.). If it does, it will proceed as usual by forwarding the SIP INVITE request towards emergency CSCF and eventually to the PSAP, if not, it will reject even the anonymous emergency session, such that the UE cannot establish an emergency session at all. In other words, the UE attempts the emergency session as an anonymous emergency session and it will be rejected in the IMS network if the local regulation does not allow anonymous emergency sessions.

Conventionally, the user is authenticated in EPS (assuming normal PDN connection using ims-APN). Therefore, MME is aware of user's subscription information. For example user's subscription information contains correlation MSISDN.

According to some embodiments of the invention, 1. user's identity is passed from MME to PDN GW/GGSN as part of emergency configuration data. MME is not aware of the IP address which will be given to the UE;
2. user's identity is passed from PDN GW to PCRF along with the IP address of the UE, e.g. during authorization of emergency default bearer or during setup of dedicated bearer for IMS emergency session. Note that PDN GW assigns IP address/prefix to UE and that MME is aware of the user's identity;
3. user's identity is passed from PCRF to P-CSCF with respect to the IP address of the UE;
4. the provided user identity is used in the emergency session setup to the PSAP, e.g. when the P-CSCF receives emergency INVITE request from the UE.

According to such embodiments of the invention, the "anonymous caller identification" (that would be otherwise provided to the PSAP in emergency session setup) is replaced by the network authorized user identity.

Note that MME, PDN GW, PCRF, and P-CSCF belong to the visited network in which the UE is roaming.

In the context of the present application, "user's identity" (and corresponding expressions such as "user identity" and "identity of the user") means an identity of the user which home network provides to the visited network (via the HSS) as part of regular subscription data required for accessing visited EPS. That is, the user identity is considered to be authenticated by the home network.

Hereinafter, several implementations according to some embodiments of the invention are described in detail, also with reference to FIGS. 4 to 6.

Figure 4:
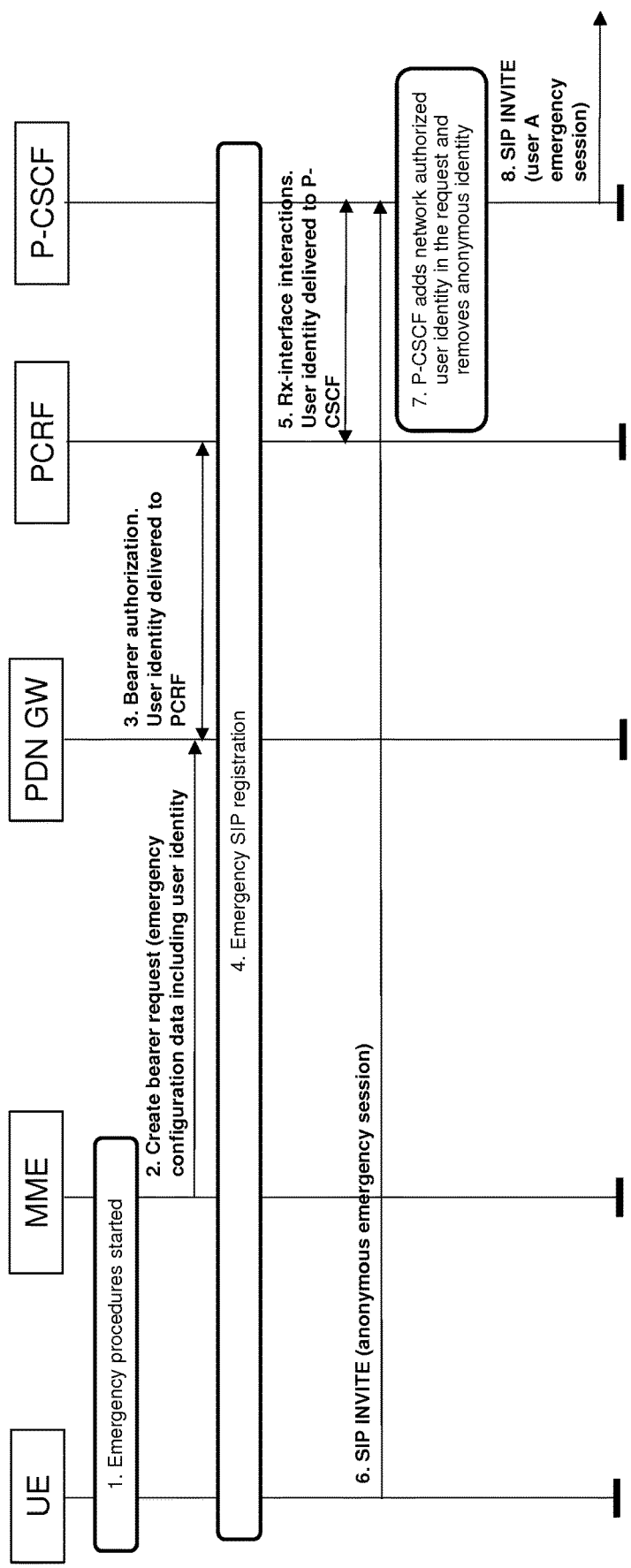
FIG. 4 shows a message flow according to an embodiment of the invention.

FIG. 4 shows a message flow according to an embodiment of the invention. In this embodiment, the UE may be a conventional UE. The message flow is as follows:

1. To start the emergency procedure, conventional procedures (e.g. according to 3GPP specifications) are followed between UE and MME (see FIG. 3).
2. MME detects that (roaming) user is requesting emergency bearer services. The MME includes user's identity (e.g. correlation MSISDN or SIP URI) in the request to create a bearer which is sent to the PDN GW.
3. When bearer authorization is performed, then PDN GW delivers user identity to PCRF along with the IP address assigned to the UE by PDN GW. The PCRF stores the user identity and IP address associated to the emergency connectivity. Alternatively, PDN GW may deliver the user identity when a dedicated bearer is established.
4. Once rest of bearer establishment procedures are completed, the UE performs emergency session registration procedure to P-CSCF of the visited IMS. This will fail as the P-CSCF does not have roaming interface towards the home network. P-CSCF returns (504) Server Timeout response to the UE.

5. The P-CSCF performs Rx reference point interactions with PCRF, e.g. it performs subscription to bearer events by interacting with the PCRF. In general, P-CSCF may inform PCRF on emergency procedures such as a failed emergency procedure (e.g. the failed emergency session registration attempt of 4.). The information comprises the IP address of the UE. In response to being informed, the PCRF delivers user identity information to the P-CSCF as new information. P-CSCF stores the binding of the user identity and the source IP address.

6. According to the current 3GPP specifications (TS 24.229), upon reception of 504 response, the UE may potentially try to re-send the REGISTER one or more times, but all these attempts will fail. The UE then proceeds with the emergency session setup without registration. The UE sends an emergency SIP INVITE request to the P-CSCF. The user identity is set to "anonymous".

7. The P-CSCF receives the request. The P-CSCF uses the source IP address used in the SIP INVITE request to find the user identity stored in step 5. If a match is found the P-CSCF adds PCRF provided user identity information to the SIP INVITE request.

8. The P-CSCF sends the SIP INVITE request forward.

More in detail, in some embodiments of the invention, Rx reference point interaction according to 5. may be implemented as follows:

a) P-CSCF detects emergency registration from the UE or detects emergency session from the UE
b) P-CSCF sends Diameter request (e.g. according to 3GPP TS 29.214) such as AA-Request or RE-Auth-Request. This request should contain existing Service-URN parameter having indication of emergency traffic.
c) PCRF receives the request and the response includes user's identity in AA-Response or RE-Auth-Response, respectively.

According to these implementations, AA-Request and/or RE-Auth-Request commands and their parameters (used in b)) need not to be modified.

In some embodiments of the invention, a dedicated command or a modified command such as a modified AA-Request or RE-Auth-Request may be used to request the user identity on the Rx interface from PCRF.

As a variant to the solution 1 above, the P-CSCF interacts with the PCRF upon reception of the emergency session setup (i.e. INVITE) and PCRF provides user identity only during this interaction. That is, actions 5 and 6 of FIG. 4 are interchanged. In this variant, the P-CSCF does not need to store the binding for duration between reception of REGISTER and INVITE messages.

Figure 5:
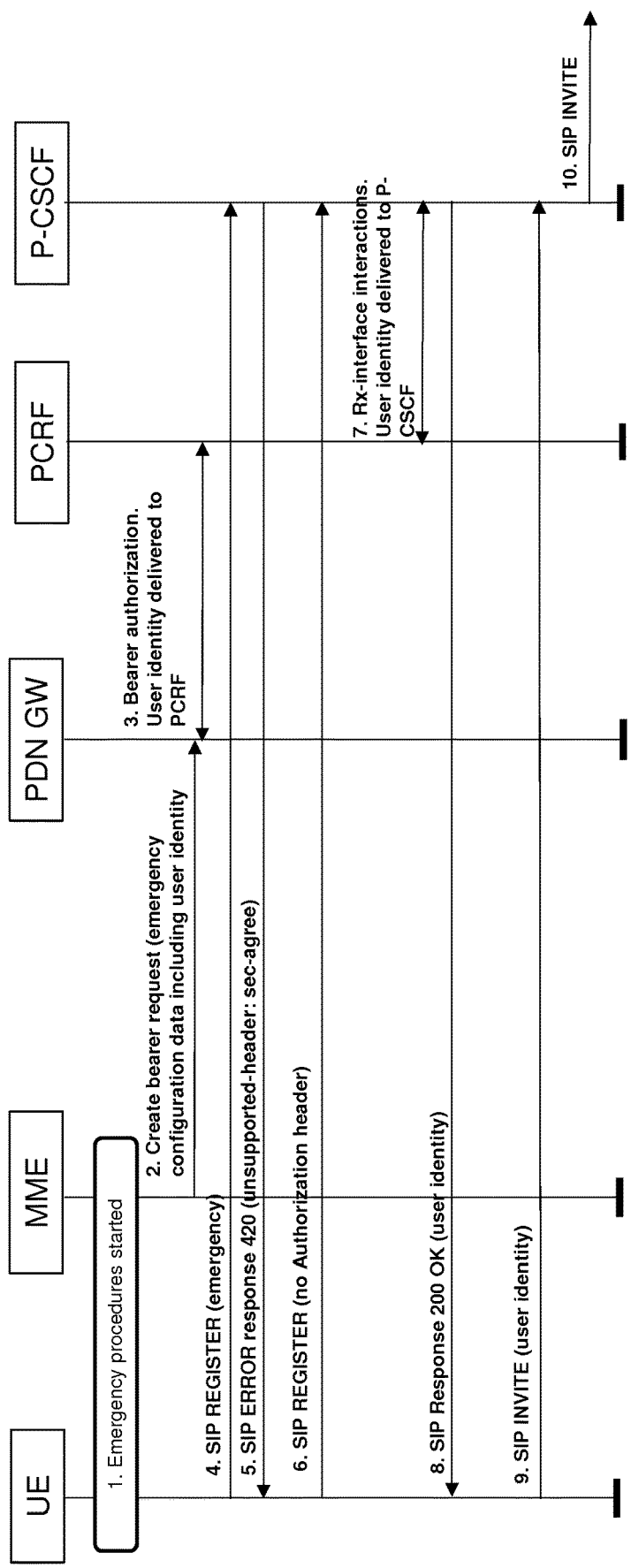
FIG. 5 shows a message flow according to an embodiment of the invention.

FIG. 5 shows another message flow according to an embodiment of the invention. According to this embodiment, the UE may be a conventional one supporting GIBA, e.g. as specified in 3GPP TS 24.229. Also, P-CSCF has to support GIBA. Actions 1 to 3 are the same as according to FIG. 4 and an explanation thereof is omitted here.

4. UE tries to register at P-CSCF.
5. P-CSCF responds to the initial REGISTER request with (420) Bad Extension response with sec-agree value listed in the unsupported header field.
6. Due to the 420 response, UE (supporting GIBA) will then, according to 3GPP TS 24.229, attempt a new initial registration without Authorization header field.
7. P-CSCF and PCRF then perform Rx interface interactions corresponding to action 5 of FIG. 4, such that P-CSCF is informed on the correlation of IP address and user identity. In this case, P-CSCF may query the user identity based on the IP address of the UE (source IP address of the registration request).
8. P-CSCF can then accept the registration with 200 OK and provide the user identity to the UE in the P-associated-URI header field of the 200 OK response for REGISTER. P-CSCF stores the association of the UE IP address according to 3GPP TS 24.229.
9. UE performs an emergency session setup with the user identity provided in 8., according to 3GPP TS 24.229. According to this specification, P-CSCF then authenticates the user based on the source IP address of the INVITE and verifies that the UE provided user identity matches with the stored identity. In case there is a match, P-CSCF adds the user identity to the P-Asserted-identity header field, and proceeds to forward the message towards the PSAP.

From the UE point of view, the procedure is the same as specified for GIBA procedures in 3GPP TS 24.229.

In a variant of the embodiment of FIG. 5, which is an embodiment of the invention, too, P-CSCF and PCRF perform their Rx interface interactions upon the failed registration (action 4), corresponding to the embodiment shown in FIG. 4. However, in this case, P-CSCF has to store the correlation of IP address and user identity for some time. On the other hand, P-CSCF may provide the response to the registration without authorization header (6.) faster than according to the embodiment of FIG. 5. In particular, the Rx interface interactions may be performed in parallel to actions 5 and 6 involving the UE.

In some embodiments of the invention according to FIG. 5 or its variant, P-CSCF performs an additional comparison. Namely, in step 6 P-CSCF receives the REGISTER request from the UE. The request comprises IP addresses at least in two places: in real IP packet (denoted here as a source IP address) and IP address in SIP signaling. Under typical conditions, the IP addresses are the same.

In some embodiments of the invention, P-CSCF uses source IP address to query the user's identity from PCRF. That is, the query is based on the origin of the message comprising the REGISTER request.

In some embodiments of the invention, P-CSCF uses IP address of SIP signaling to query the user's identity from PCRF. That is, the query is based on the origin of the emergency procedure (on SIP level). In some of these embodiments, as there is a risk that UE may fake one or both of these IP addresses (or in view of other potential misbehavior (errors) in the message chain), P-CSCF may not trust SIP level IP address but P-CSCF may take into account the source IP address, too (as it is done in conventional GIBA procedures). Then in step 7, P-CSCF queries user's identity based on SIP level IP address from PCRF using Rx reference point to get both network authorized IP address and user's identity from PCRF. Then the P-CSCF compares source IP address and network authorized IP address. If those are the same then user's identity is provided to UE in step 8. Otherwise, the method stops because it is assumed that the IP address is faulty.

Figure 6:
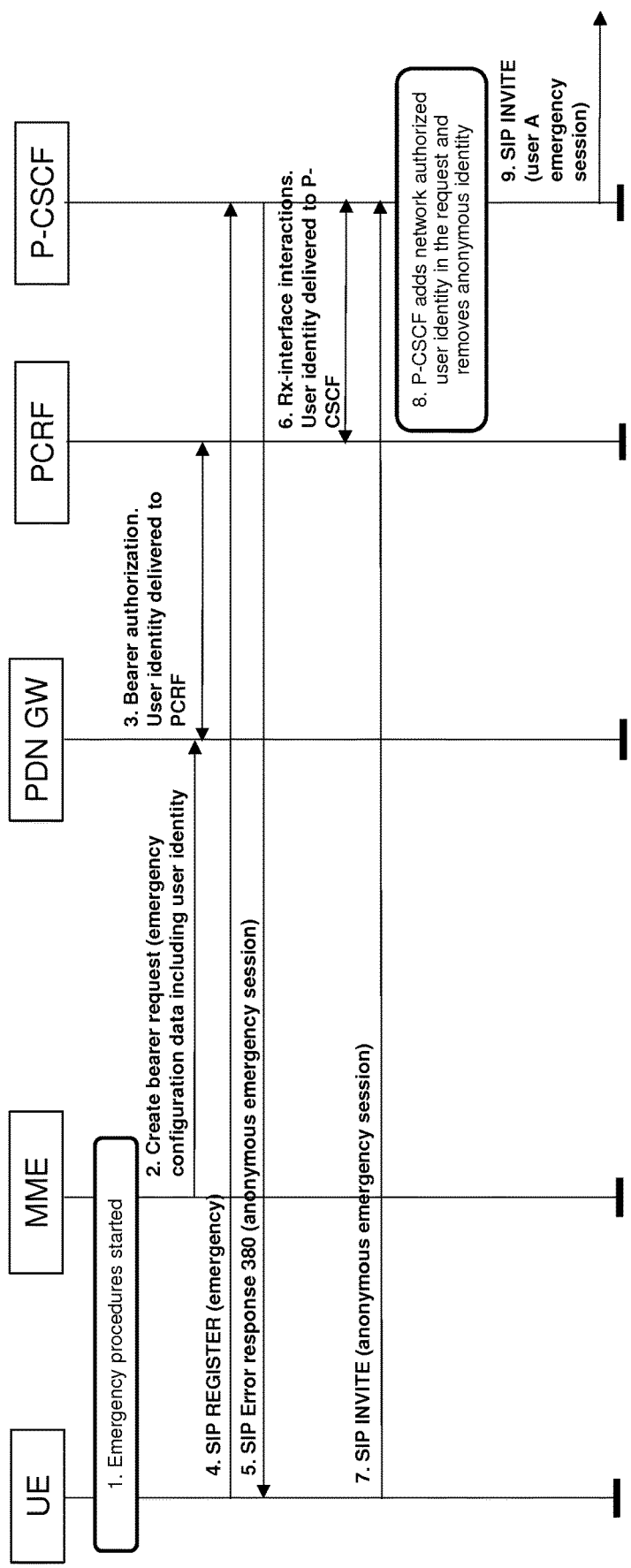
FIG. 6 shows a message flow according to an embodiment of the invention.

FIG. 6 shows another message flow according to an embodiment of the invention. In this alternative, the UE is modified compared to a conventional UE in order to optimize the procedure. Namely, P-CSCF indicates to the UE during the registration to proceed with unauthenticated emergency session setup.

According to FIG. 6, actions 1 to 4 are the same as according to FIG. 5 and an explanation thereof is omitted here.

5. In response to the registration attempt of 4., P-CSCF provides an explicit indication to the UE that the authentication during the registration fails, such that the UE must proceed with the emergency service session setup without authentication. This may be implemented e.g. as a new indicator in a payload of (380) Alternative Service response to SIP REGISTER request. The indication may comprise one or both of the information that the authentication fails and that UE should proceed with setting up an anonymous emergency service. If only one of these pieces of information is provided, the UE may interpret this one piece of information as an indication for both pieces of information.
6. P-CSCF and PCRF perform Rx interface interactions, as described for FIG. 5. These interface interactions may be performed e.g. in parallel to actions 5 and 7 involving the UE, or they may be performed before or after one or both of actions 5 and 7.
7. Due to the received indication (5.), UE invites to set up an anonymous SIP emergency session (by SIP INVITE).
8. P-CSCF adds the user identity to the invitation by replacing the anonymous identity.
9. P-CSCF forwards SIP INVITE with the user identity, corresponding to action 8 of FIG. 4.

Compared to the embodiment of FIG. 4, the embodiment of FIG. 6 may speed up the emergency session setup as the UE knows not to re-attempt the emergency registration.

According to still another embodiment of the invention, the UE is modified compared to a conventional UE, too. Namely, UE learns via NAS level indication that the emergency service is provided only without authentication.

Such an indication may be provided to the UE e.g. when the UE performs EPS Attach or Tracking Area Update. The network may signal that the emergency service is provided only without authentication when it accepts the EPS Attach or Tracking Area Update. E.g., this indication may be part of EPS Networks Feature Support information element of Attach Accept message/Tracking Area Update accept message.

As another option, such an indication may be provided when the UE initiates the UE Requested PDN procedure by the transmission of a PDN Connectivity Request. The network may signal that the emergency service is provided only without authentication when it accepts the PDN connectivity request. If this behaviour is to be standardized, it would require a modification of 3GPP TS 24.301, section 8.3.6., e.g. by a new information element or addition of extended EPS Network Feature Support information element).

In some embodiments, the indication is delivered to inbound roamers only and not to home users. In some embodiments, the indication is provided to all users, and home users disregard the indication when they set up an emergency session. I.e., home users may initiate a registered emergency session regardless of the indication.

Upon reception of the new indicator, the UE knows it may not try to register for an emergency session but proceed with the emergency service session setup without IMS registration. That is, compared to the embodiment of FIG. 6, actions 4 and 5 are omitted. This may speed up the emergency session setup as the UE knows not to attempt the emergency registration that would fail in any case. P-CSCF then authenticates the user at the emergency session setup as in Solution 1, and inserts the authenticated user identity to the INVITE request towards the PSAP.

Figure 7:
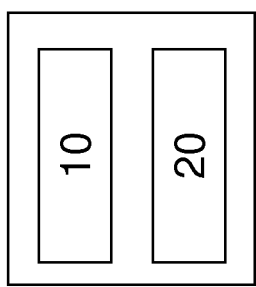
FIG. 7 shows an apparatus according to an embodiment of the invention.
Figure 8:
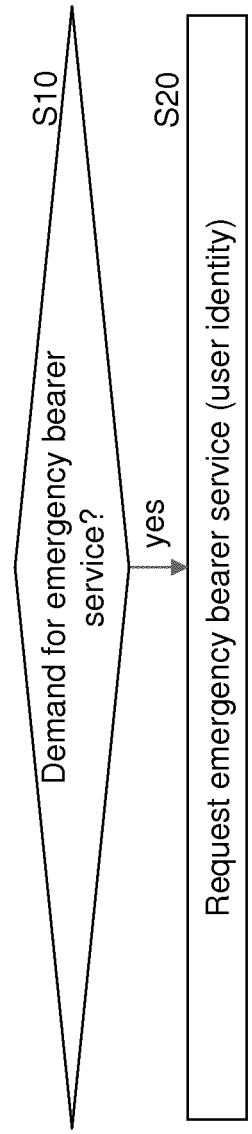
FIG. 8 shows a method according to an embodiment of the invention.

In some of the embodiments above, the UE may attempt to set up a registered emergency session by default. In some embodiments, the UE may attempt to set up an anonymous emergency session by default, e.g. when the UE is roaming. In particular for such UE, the following implementation alternative may be useful:

FIG. 7 shows an apparatus according to an embodiment of the invention. The apparatus may be a management entity such as a MME or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus. The apparatus comprises monitoring means 10 and requesting means 20.

The monitoring means 10 monitor if a demand for an emergency bearer service is received from a user (S10). The demand may not comprise an internet protocol address.

If the demand is received (S10="yes"), the requesting means 20 requests a creation of an emergency bearer (S20). The request by the requesting means 20 includes an identity of the user.

Figure 9:
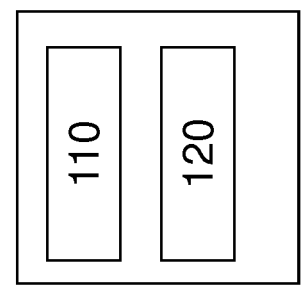
FIG. 9 shows an apparatus according to an embodiment of the invention.
Figure 10:
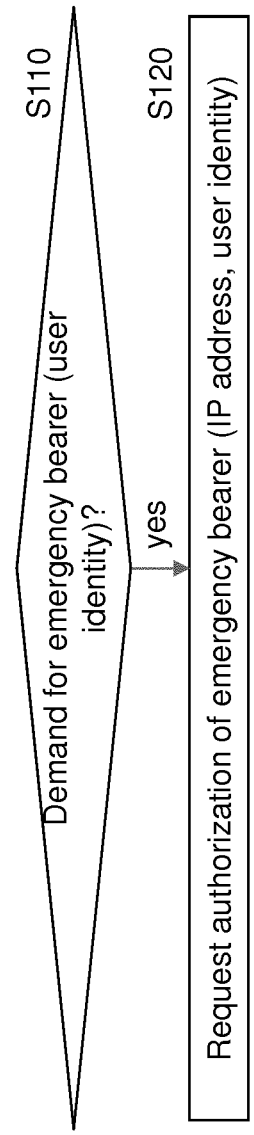
FIG. 10 shows a method according to an embodiment of the invention.

FIG. 9 shows an apparatus according to an embodiment of the invention. The apparatus may be a gateway such as a PDN GW or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises monitoring means 110 and requesting means 120.

The monitoring means 110 monitor if a demand to create an emergency bearer service is received, wherein the demand comprises an identity of a user (S110). The demand may not comprise an internet protocol address.

If the demand is received (S110="yes"), the requesting means 120 requests an authorization of the emergency bearer (S120). The request by the requesting means 120 includes an internet protocol address assigned to the user and the identity of the user.

Figure 12:
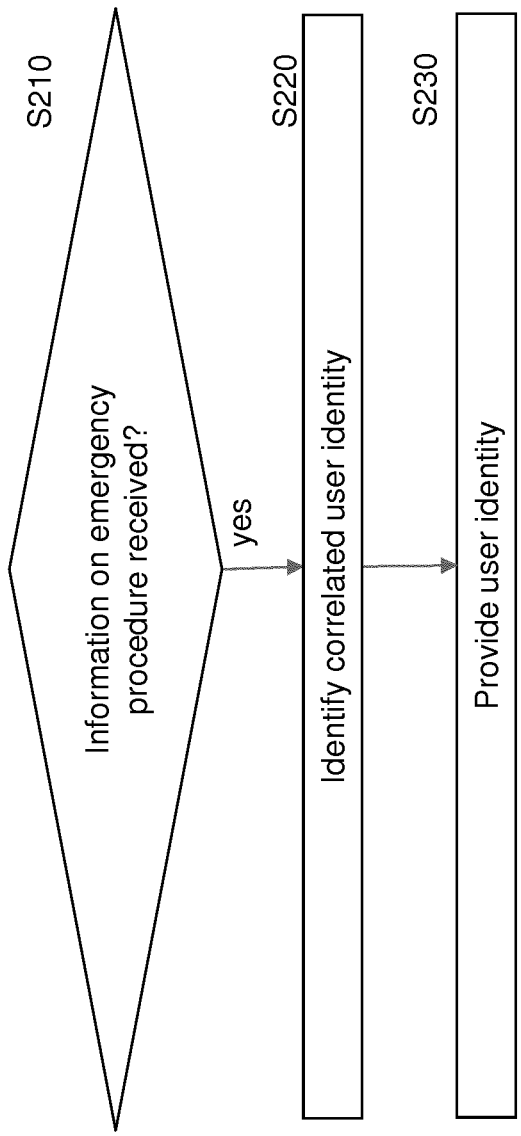
FIG. 12 shows a method according to an embodiment of the invention.
Figure 11:
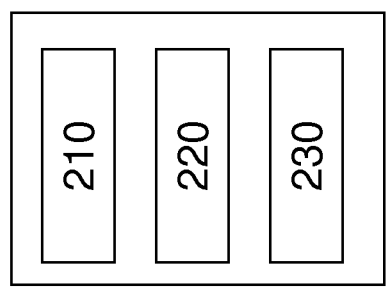
FIG. 11 shows an apparatus according to an embodiment of the invention.

FIG. 11 shows an apparatus according to an embodiment of the invention. The apparatus may be a rules function such as a PCRF or an element thereof. FIG. 12 shows a method according to an embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises monitoring means 210, identifying means 220, and providing means 230.

The monitoring means 210 monitors if an information about emergency procedures is received (S210). The received information comprises an internet protocol address from where the at least one of the registration and the invitation is originated.

If the information is received (S210="yes"), the identifying means 220 identifies an identity of a user correlated to the internet protocol address comprised in the received information (S220).

In response to the received information, the providing means 230 provides the identity of the user correlated to the internet protocol address (S230).

FIG. 13 shows an apparatus according to an embodiment of the invention. The apparatus may be a proxy such as a P-CSCF or an element thereof. FIG. 14 shows a method according to an embodiment of the invention. The apparatus according to FIG. 13 may perform the method of FIG. 14 but is not limited to this method. The method of FIG. 14 may be performed by the apparatus of FIG. 13 but is not limited to being performed by this apparatus.

The apparatus comprises monitoring means 310, correlation checking means 320, replacing means 330, and forwarding means 340.

The monitoring means 310 monitors if an invitation to an emergency session of an anonymous user (anonymous emergency session) is received from an internet protocol address (S310).

If the invitation to the anonymous emergency session is received (S310="yes"), the correlation checking means 320 checks if an identity of a user is correlated to the internet protocol address from where the invitation is received (S320).

The replacing means 330 replaces, if the internet protocol address is correlated to the identity of the user, the identification of the anonymous user in the invitation by the identity of the user correlated to the internet protocol address (S330).

Then, the forwarding means 340 forwards the invitation comprising the identity of the user instead of the identification of the anonymous user (S340).

Figure 16:
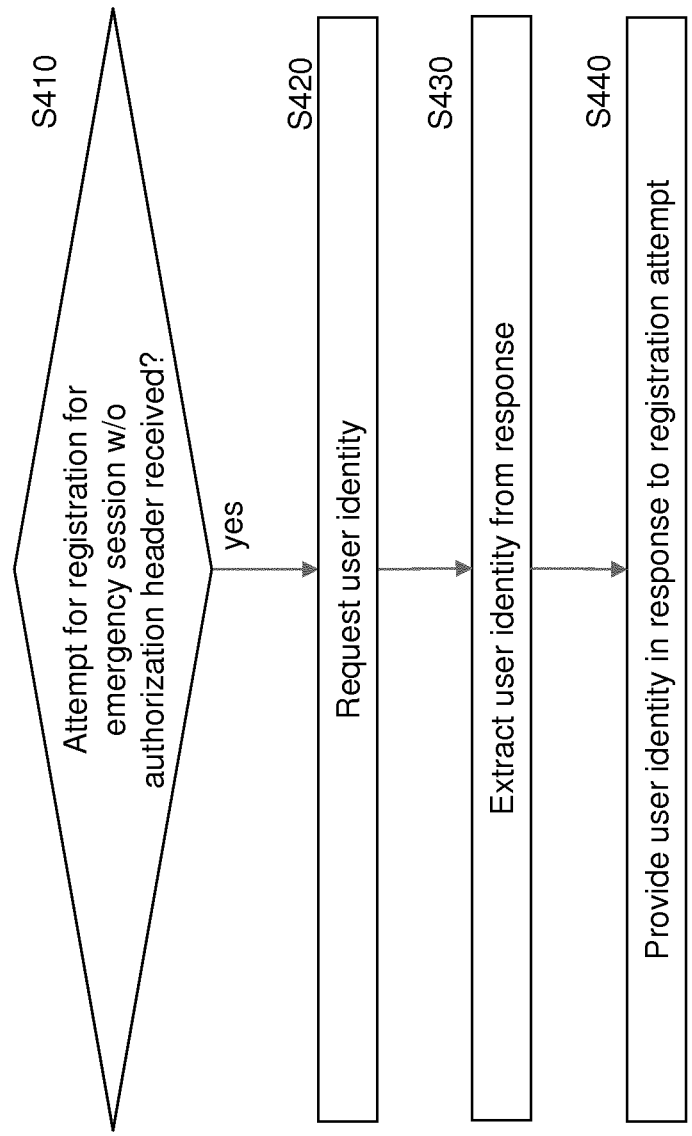
FIG. 16 shows a method according to an embodiment of the invention.
Figure 15:
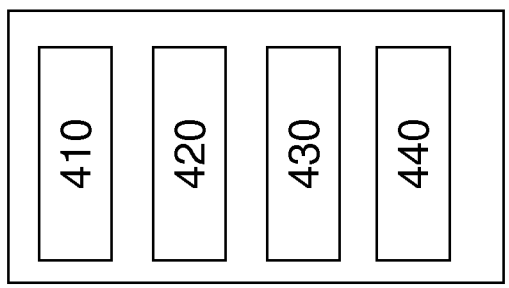
FIG. 15 shows an apparatus according to an embodiment of the invention.

FIG. 15 shows an apparatus according to an embodiment of the invention. The apparatus may be a proxy such as a P-CSCF or an element thereof. FIG. 16 shows a method according to an embodiment of the invention. The apparatus according to FIG. 15 may perform the method of FIG. 16 but is not limited to this method. The method of FIG. 16 may be performed by the apparatus of FIG. 15 but is not limited to being performed by this apparatus.

The apparatus comprises monitoring means 410, requesting means 420, extracting means 430, and providing means 440.

The monitoring means 410 monitors if an attempt to register an emergency session of a user is received from an internet protocol address (S410). The attempt does not comprise an authorization header.

If the attempt is received (S410="yes"), the requesting means 420 requests an identity of the user (S420). The request comprises the internet protocol address from which the attempt is received.

The extracting means 430 extracts the identity of the user from a message received in response to the request (S430).

The providing means 440 provides the identity of the user in response to the attempt to register (S440).

FIG. 17 shows an apparatus according to an embodiment of the invention. The apparatus may be a terminal such as a UE or an element thereof. FIG. 18 shows a method according to an embodiment of the invention. The apparatus according to FIG. 17 may perform the method of FIG. 18 but is not limited to this method. The method of FIG. 18 may be performed by the apparatus of FIG. 17 but is not limited to being performed by this apparatus.

The apparatus comprises monitoring means 510 and inhibiting means 520.

The monitoring means 510 monitors if an indication to invite to an anonymous emergency session is received (S510). If the indication is received ("yes" in S510), the inhibiting means 520 inhibits the apparatus from attempting to perform emergency registration (S520).

FIG. 19 shows an apparatus according to an embodiment of the invention. The apparatus may be a network element such as MME or an element thereof. FIG. 20 shows a method according to an embodiment of the invention. The apparatus according to FIG. 19 may perform the method of FIG. 20 but is not limited to this method. The method of FIG. 20 may be performed by the apparatus of FIG. 19 but is not limited to being performed by this apparatus.

The apparatus comprises monitoring means 710 and indicating means 720.

The monitoring means 710 monitors if a user is to be connected to the apparatus (S710). If the user is to be connected (S710="yes"), the indicating means 720 indicates to the user not to register for an emergency session (S720).

FIG. 21 shows an apparatus according to an embodiment of the invention. The apparatus comprises at least one processor 910, at least one memory 920 including computer program code, and the at least one processor, with the at least one memory and the computer program code, being arranged to cause the apparatus to at least perform at least one of the methods according to FIGS. 8, 10, 12, 14, 16, 18, and 20.

Embodiments of the invention may be employed in a 3GPP network such as an LTE-A network. They may be employed also in other 3GPP and non-3GPP mobile networks such as CDMA, EDGE, LTE, UTRAN, WiFi, WLAN networks, etc. They may also be employed in fixed networks (e.g. broadband networks) enabling IMS emergency sessions.

A terminal may be a user equipment such as a mobile phone, a smart phone, a PDA, a laptop, a tablet PC, a wearable, a machine-to-machine device, or any other device which may be connected to the respective network such as a 3GPP network. If not otherwise indicated or made clear from the context, the terms "UE" and "user" are synonymously used in the present application.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

Error codes such as "504", "420", "380", and "200" are given as examples only and are not intended to be limiting in any way.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a management entity such as a MME, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a gateway such as a PGW, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a control function such as a PCRF, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a proxy such as a P-CSCF, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a terminal such as a UE, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising:
at least one processor; and
at least one memory including computer program code,
wherein the at least one memory and the computer program code are configured to, with the at least one processor, cause the apparatus at least to:
monitor if information about an emergency procedure is received, wherein the information comprises an internet protocol address from where at least one of a registration and an invitation originated, wherein the information is associated with at least one session initiation protocol invite request associated with general packet radio service-internet protocol multimedia subsystem-bundled authentication;
identify an identity of a user correlated to the internet protocol address, wherein the identity of the user comprises a mobile station integrated services digital network number; and
provide the identity of the user in response to the information.

2. An apparatus, comprising:
at least one processor; and
at least one memory including computer program code,
wherein the at least one memory and the computer program code are configured to, with the at least one processor, cause the apparatus at least to:
monitor if an invitation to an emergency session of an anonymous user is received from an internet protocol address, wherein the invitation is associated with at least one session initiation protocol invite request associated with general packet radio service-internet protocol multimedia subsystem-bundled authentication;
if the invitation is received, check if an identity of a user is correlated to the internet protocol address, wherein the identity of the user comprises a mobile station integrated services digital network number;
replace, if the internet protocol address is correlated to the identity of the user, the identification of the anonymous user in the invitation with the identity of the user; and
forward the invitation comprising the identity of the user.

3. The apparatus according to claim 2, wherein the at least one memory and the computer program code are further configured to, with the at least one processor, cause the apparatus at least to:
check if an attempt to register for a registered emergency session from the internet protocol address fails;
supervise, if the attempt fails, if a first message received in response to information sent on the failed attempt comprises the identity of the user; and
store, if the first message comprises the identity of the user, the identity of the user as correlated to the internet protocol address.

4. The apparatus according to claim 3, wherein the at least one memory and the computer program code are further configured to, with the at least one processor, cause the apparatus at least to:
indicate, if the registration fails, to set up an anonymous emergency session in response to the attempt to register.

5. The apparatus according to claim 2, wherein the at least one memory and the computer program code are further configured to, with the at least one processor, cause the apparatus at least to provide information on the invitation and to receive the identity in response to the information.

6. The apparatus according to claim 2, wherein the at least one memory and the computer program code are further configured to, with the at least one processor, cause the apparatus at least to:
request the identity of the user if an invitation of an anonymous user to set up an emergency session is received, wherein the request comprises the internet protocol address; and
check if a second message received in response to the request comprises the identity of the user, wherein
the checking if the identity of the user is correlated to the internet protocol address comprises correlating, if the second message comprises the identity of the user, the identity of the user to the internet protocol address.

7. A method, comprising:
monitoring if information about an emergency procedure is received, wherein the information comprises an internet protocol address from where at least one of a registration and an invitation originated, wherein the information is associated with at least one session initiation protocol invite request associated with general packet radio service-internet protocol multimedia subsystem-bundled authentication;

identifying an identity of a user correlated to the internet protocol address, wherein the identity of the user comprises a mobile station integrated services digital network number; and providing the identity of the user in response to the information.

8. A method, comprising:

monitoring if an invitation to an emergency session of an anonymous user is received from an internet protocol address, wherein the invitation is associated with at least one session initiation protocol invite request associated with general packet radio service-internet protocol multimedia subsystem-bundled authentication;

checking, if the invitation is received, if an identity of a user is correlated to the internet protocol address, wherein the identity of the user comprises a mobile station integrated services digital network number;

replacing, if the internet protocol address is correlated to the identity of the user, the identification of the anonymous user in the invitation with the identity of the user; and forwarding the invitation comprising the identity of the user.

9. The method according to claim 8, further comprising:

checking if an attempt to register for a registered emergency session from the internet protocol address fails;

supervising, if the attempt fails, if a first message received in response to a sent information sent on the failed attempt comprises the identity of the user; and storing, if the first message comprises the identity of the user, the identity of the user as correlated to the internet protocol address.

10. The method according to claim 8, wherein:

the checking if the identity of the user is correlated to the internet protocol address comprises providing information on the invitation and receiving the identity in response to the information.

11. The method according to claim 10, further comprising:

indicating, if the registration fails, to set up an anonymous emergency session in response to the attempt to register.

12. The method according to claim 8, further comprising:

requesting the identity of the user if an invitation of an anonymous user to set up an emergency session is received, wherein the request comprises the internet protocol address;

checking if a second message received in response to the request comprises the identity of the user, wherein the checking if the identity of the user is correlated to the internet protocol address comprises correlating, if the second message comprises the identity of the user, the identity of the user to the internet protocol address.

13. A method, comprising:

monitoring if an attempt to register an emergency session of a user is received, wherein the attempt comprises a first internet address as an origin, and the attempt does not comprise an authorization header, wherein the attempt is associated with at least one session initiation protocol invite request associated with general packet radio service-internet protocol multimedia subsystem-bundled authentication;

requesting an identity of the user if the attempt is received, wherein the request comprises the first internet protocol address and the identity of the user comprises a mobile station integrated services digital network number;

extracting the identity of the user from a message received in response to the request; and providing, if the message comprises the identity of the user, the identity of the user in response to the attempt.

14. The method according to claim 13, wherein:

the attempt comprises the first internet protocol address and a second internet protocol address, the first internet protocol address defines an origin of the emergency session and the second internet protocol address denotes a source of a message comprising the attempt;

the extracting comprises further extracting a network authorized internet protocol address from the received message; and the method further comprises:

comparing the second internet protocol address with the network authorized internet protocol address; and inhibiting the providing of the identity of the user if the second internet protocol address is different from the network authorized internet protocol address.

15. The method according to claim 13, wherein the identity of the user is considered to be authenticated by a home network of the user.

16. The method according to claim 15, wherein the identity of the user comprises a unified resource identifier.

* * * * *